United States Patent [19]

Close et al.

[11] Patent Number: 5,202,884
[45] Date of Patent: Apr. 13, 1993

[54] MULTIPLEXING SCHEME FOR MODEM CONTROL SIGNALS

[75] Inventors: Ciaran B. Close, Dublin; Bryan T. Campbell; Una M. Quinlan, both of Clonmel, all of Ireland

[73] Assignee: Digital Equipment Corporation, Maynard, Mass.

[21] Appl. No.: 722,686

[22] Filed: Jun. 28, 1991

[51] Int. Cl.⁵ ............................................. H04J 3/02
[52] U.S. Cl. ..................................... 370/94.1; 375/8; 375/121
[58] Field of Search ............ 340/825.06, 825.11; 375/7, 8, 9, 36, 121; 370/24, 77, 94.1, 110.1; 395/917

[56] References Cited

U.S. PATENT DOCUMENTS 4,637,035 1/1987 Betts .............................. 375/8

Primary Examiner—Benedict V. Safourek
Attorney, Agent, or Firm—Kenyon & Kenyon

[57] ABSTRACT

In an apparatus to couple a plurality of line interfaces with corresponding modems ports, status and control signals are time-division-multiplexed (TDM) into a data stream before being exchanged between the devices. This substantially reduces the number of communication wires required and allows for several modems to be coupled in close proximity to a line interface card. Packet recognition circuitry coupled to the modem ports insures that signals in the TDM data stream are transmitted to the appropriate modem ports.

20 Claims, 9 Drawing Sheets

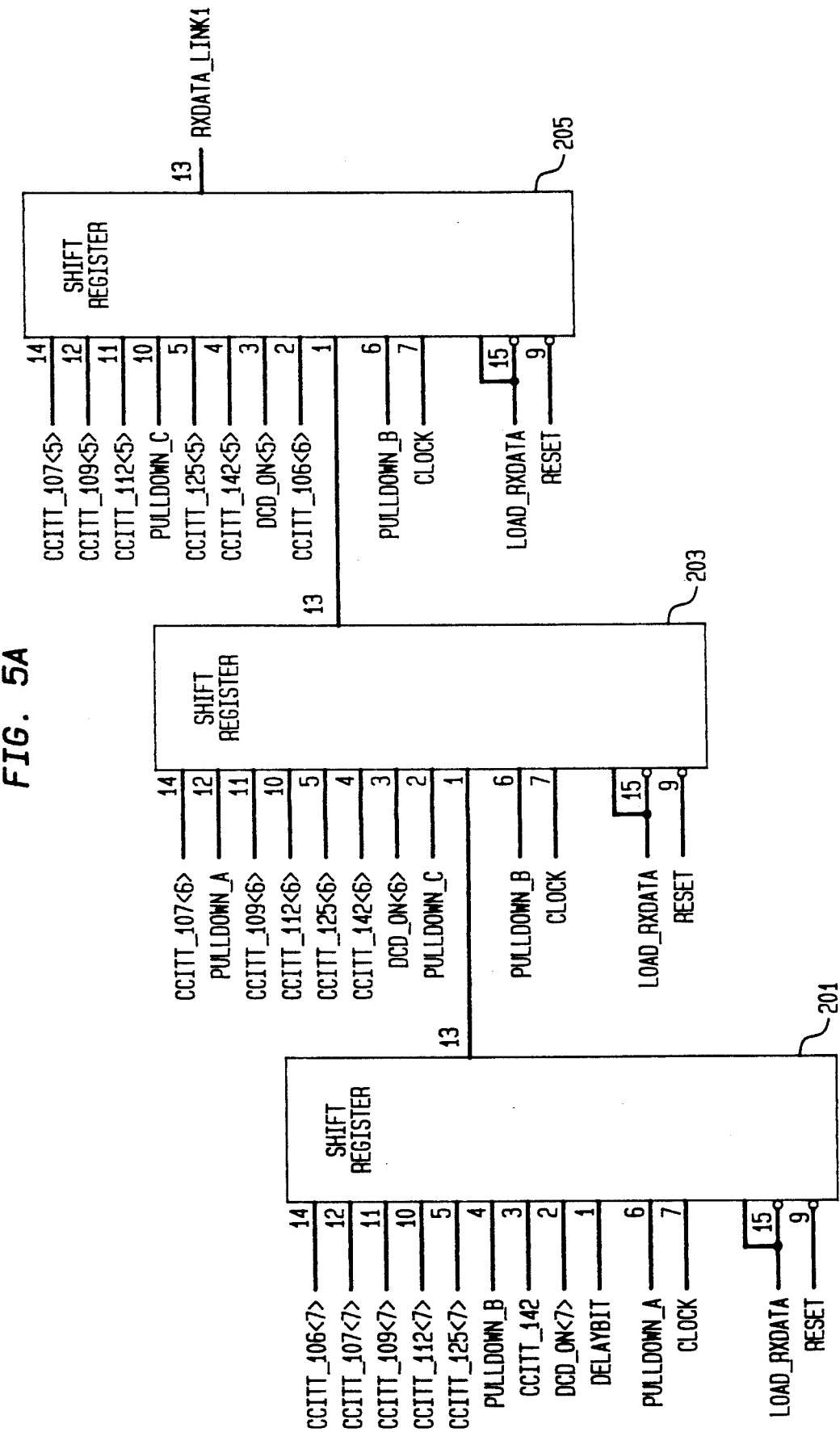

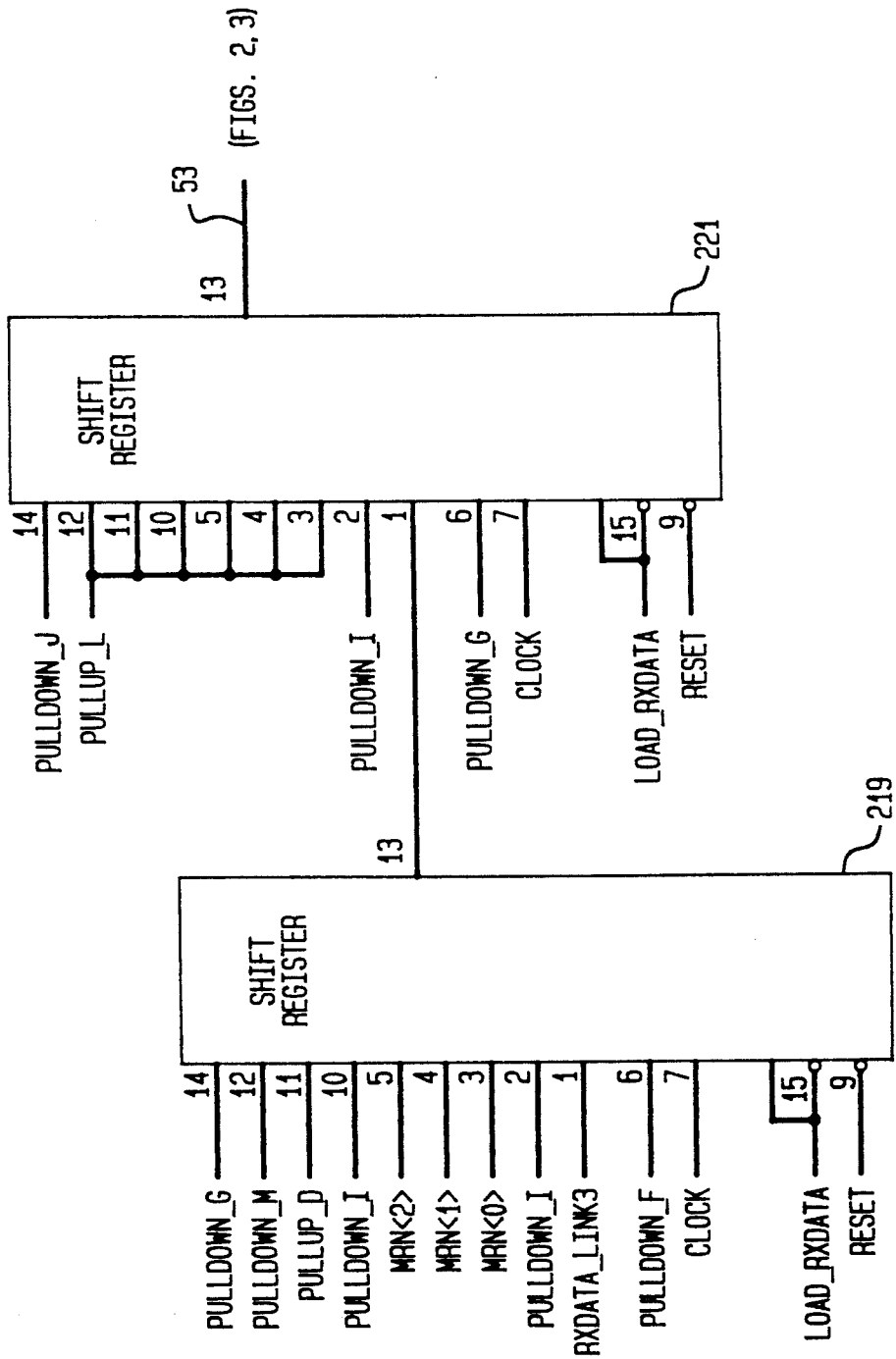

MULTIPLEXING SCHEME FOR MODEM CONTROL SIGNALS

FIELD OF THE INVENTION

The present invention is directed to a method and apparatus for transferring modem control and status signals between a host processor and a series of modems. More particularly, the present invention provides a coupling between a host processor and a series of modems that allows the transfer of modem control and status signals in a time-division-multiplexed format in order to reduce the number of wire connections between the host processor and the modems.

BACKGROUND OF THE INVENTION

One of the more common means of communication between computers and the outside world is through modulators/demodulators (modems). The coupling between a host processor and a modem requires a plurality of different communication wires. These communication wires include ground, status, control, clock, and data signals for the operation of the modem.

As processing speeds increase for computer processors, one computing device can be coupled to several modems via respective line interfaces. Unfortunately, each modem requires its own set of communication wires between itself and its respective line interface. As more modems are coupled to the computer processor, more modem communication wires are needed. For example, in a standard modem protocol, sixteen communication wires are needed for the transfer of just the control, status, clock, and data signals for proper operation. If eight modems are coupled to the computer processor, then a total of at least 128 communications wires are needed. The coupling of so many wires between the line interfaces and a modem distribution panel can be physically difficult.

SUMMARY OF THE INVENTION

The present invention is directed to a method and apparatus for reducing the number of required communication wires between a computer processor and a plurality of modems. The respective line interfaces for a plurality of modems are coupled to a remote modem distribution module via a multiplexing serial communication controller. All of the control signals of the module and modems are transmitted between the line interfaces and the serial communication controller which time-division-multiplexes (TDM) the signals before transmitting them to the remote distribution module.

The remote distribution module includes a packet receiver which receives the TDM data as a serial data stream from the multiplexing serial communication controller. In order to insure that the appropriate signals are transferred to the modems at the distribution panel, the first several bits of the serial TDM data stream are checked for a predetermined pattern by packet recognition circuitry. If such a pattern is matched, the TDM data signals are latched and the modem control and status signals are transmitted to the proper modem.

The remote distribution module includes a packet generator which is coupled to each of the modems. Status data to be sent to the line interfaces by the modems and the remote distribution module are transmitted in TDM format by the packet generator. The TDM data is received by the multiplexing serial communication controller and disseminated to the appropriate line interfaces.

In a test mode, the serial communication controller can initiate an automatic loop-back. In this operation, the TDM data passes through the packet receiver to the packet generator and back to the multiplexing serial communication controller. At this point, the controller can verify that the TDM data is being properly received and transmitted between the controller and the remote distribution module.

BRIEF DESCRIPTION OF THE DRAWINGS

FIGS. 5A-5D together provide a circuit diagram for the packet generator of the circuitry illustrated in FIG. 3.

DETAILED DESCRIPTION

Figure 1:
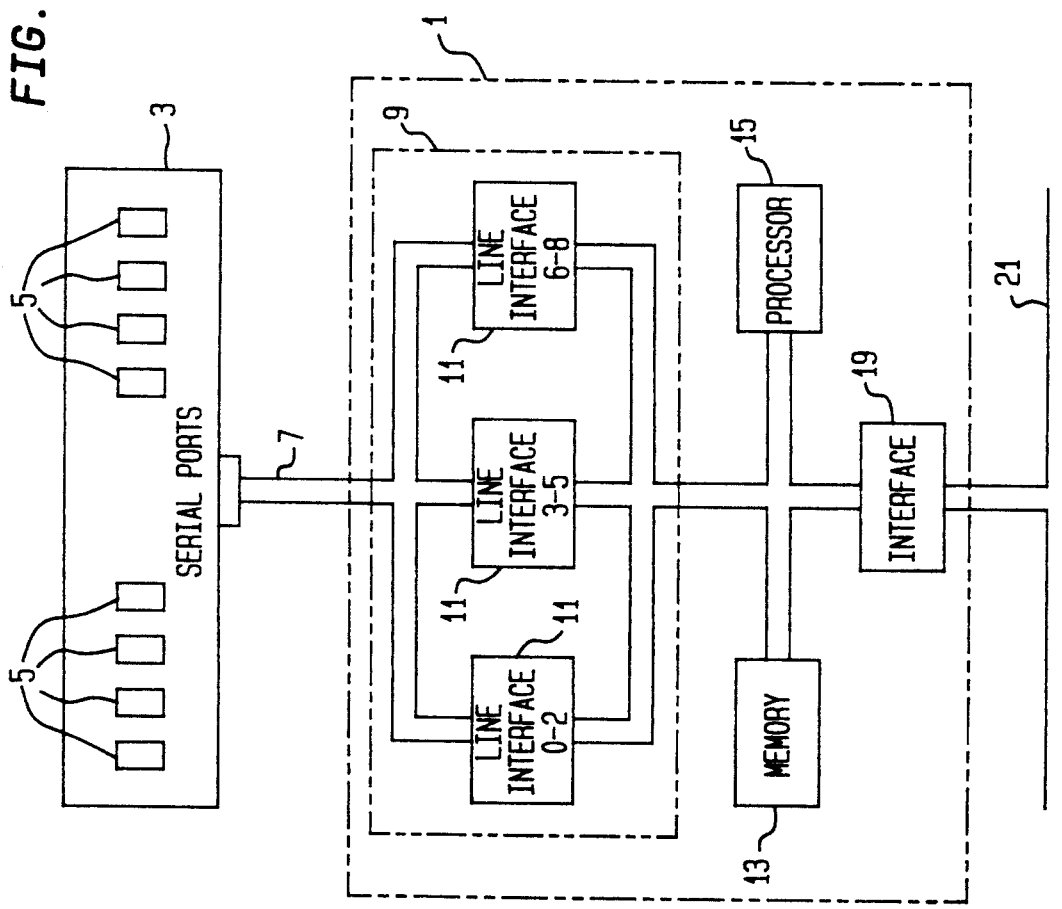
FIG. 1 is a block diagram illustrating a coupling between a line interface card and a remote distribution panel.

Referring to FIG. 1, the coupling between a line interface card 1 and a remote distribution panel 3 is shown. The line interface card can be a 64K bps low speed synchronous transmission line interface card. The line interface card 1 is coupled to the remote distribution panel 3 which is provided with eight serial ports 5, each to be coupled to a modem to provide eight separate and independent low speed communication channels for the line interface card 1. The distribution panel 3 supports, e.g., connectivity for one of the V.11/EIA-RS422, V.35 and V.28/EIA-RS-232-D modem control and signalling standards having a range of line speeds of from 1.2 to 64K bps. The ports 5 are coupled by a 50 wire cable 77 to a line interface 9 which comprises three Motorola MC68302 Integrated Multi-Protocol Processors, each of which comprises three line interfaces 11. The MC68302 processors support 16 and 32 bit CRC generation and checking, HDLC and LAPB data link layer protocols and NRZ and NRZI data encoding formats.

The line interface card 1 utilizes a subset of each of the line interface processors 11, namely the three serial communication controllers (SCC) in each processor comprising a line interface 11, for a total of nine SCC facilities. Eight of the SCC's are used for serial communication control, each dedicated to one of the eight ports 5 of the distribution panel 3. The ninth SCC is used to multiplex the modem and module signals required by the eight modems that are to be coupled to the ports 5 across a subset of the wires of the 50 wire cable 7. The line interface card 1 may also comprise a memory 13, such as a RAM, and a processor 15 coupled to a central bus 17. The memory 13 and processor 15 could be used to facilitate control of the line interface card 1. Additionally, the central bus 17 may be coupled to a system bus 21 via a bus interface 19. This would allow other components coupled to the system bus 21 to communicate with the modems coupled to the remote distribution panel 3.

In general, a modem requires the transfer of a plurality (e.g., sixteen) of signals between the modem and the line interface card 1 to provide full modem control data communications. The signals include control, data, clock and status signals. The remote distribution panel 3 is coupled to eight modems. In addition to the sixteen control, data, clock, and status signals sent between the line interface card 1 and the modem, ground and voltage level signals are required as well. The line interface card 1 is coupled directly to the remote distribution panel 3 via a 50 wire cable 7. If the remote distribution panel 3 is coupled to eight modems, the transfer of at least 128 signals is required between the line interface card 1 and the distribution panel 3. Because of the difficulty in hard wiring such a large number of signal lines, the number is reduced to thirty six using a Time Division Multiplexing (TDM) scheme according to the present invention.

Figure 2:
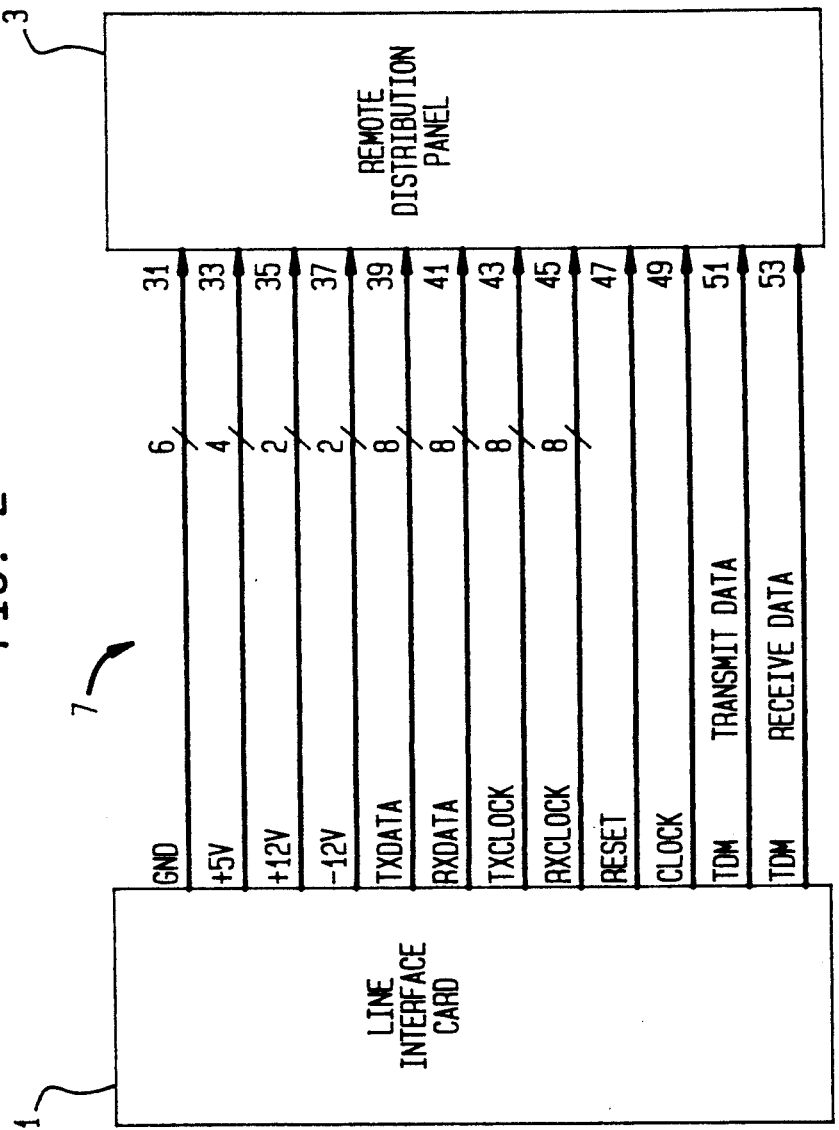
FIG. 2 is a block diagram for a fan out modem connection between the line interface card and remote distribution panel of FIG. 1.

Referring to FIG. 2, a general block diagram of the connection between the remote panel 3 and the line interface card 1 is shown. The line interface card 1 is coupled to the remote distribution panel 3 through a 50 wire cable 7 which comprises fifty signal lines 31–53. The first fourteen lines are standard ground and voltage connections. Six of the lines are for ground 31, four of the lines are for +5 volts 33, two of the lines are for +12 volts 35, and two of the lines are for −12 volts 37.

In this example, eight modems are to be coupled to the remote distribution panel 3. Eight lines are dedicated for the transmit data 39, one for each modem, and eight lines are dedicated for receive data 41, one for each modem. In addition, eight lines are dedicated for the received transmit clocks 43 one for each modem, and eight lines are dedicated for the received receive clocks 45. There is a reset line 47, which resets the remote distribution panel 3 when asserted. All modem control and status signals are transferred on TDM transmit and receive lines 51 and 53. A signal line is dedicated for the clock signal 49 of the lines 51 and 53.

The transmit data 39, receive data 41, transmit clock 43, and receive clock 45 signal lines are all coupled to their respective modems through driver receiver interfaces (not shown). The transmit line 51 is controlled by one of the SCCs of one of the MC68302 Integrated Multi-Protocol Processors on the line interface card 1, as described above.

The SCC dedicated to the control of the transmit line 51 is configured to operate in a BISYNC mode of operation. In a BISYNC mode of operation, one serial channel is used for receiving and transmitting data. The actual operation of the serial channel is determined by the toggling of an ownership bit in the MC68302 processor. The processor sends out the contents of preselected buffers, bit serially, to the SCC pin. In this embodiment, two 10-byte buffer spaces are required for transmitting and receiving data. Modem and module control information is written from the line interfaces to the transmit buffer space. Conversely, modem and module status information is read from the receive buffer space. The dedicated SCC transmits the contents of the transmit buffers to the respective SCC pin of the processor. This pin is directly coupled to the TDM transmit line 51 shown in FIG. 2.

Figure 3:
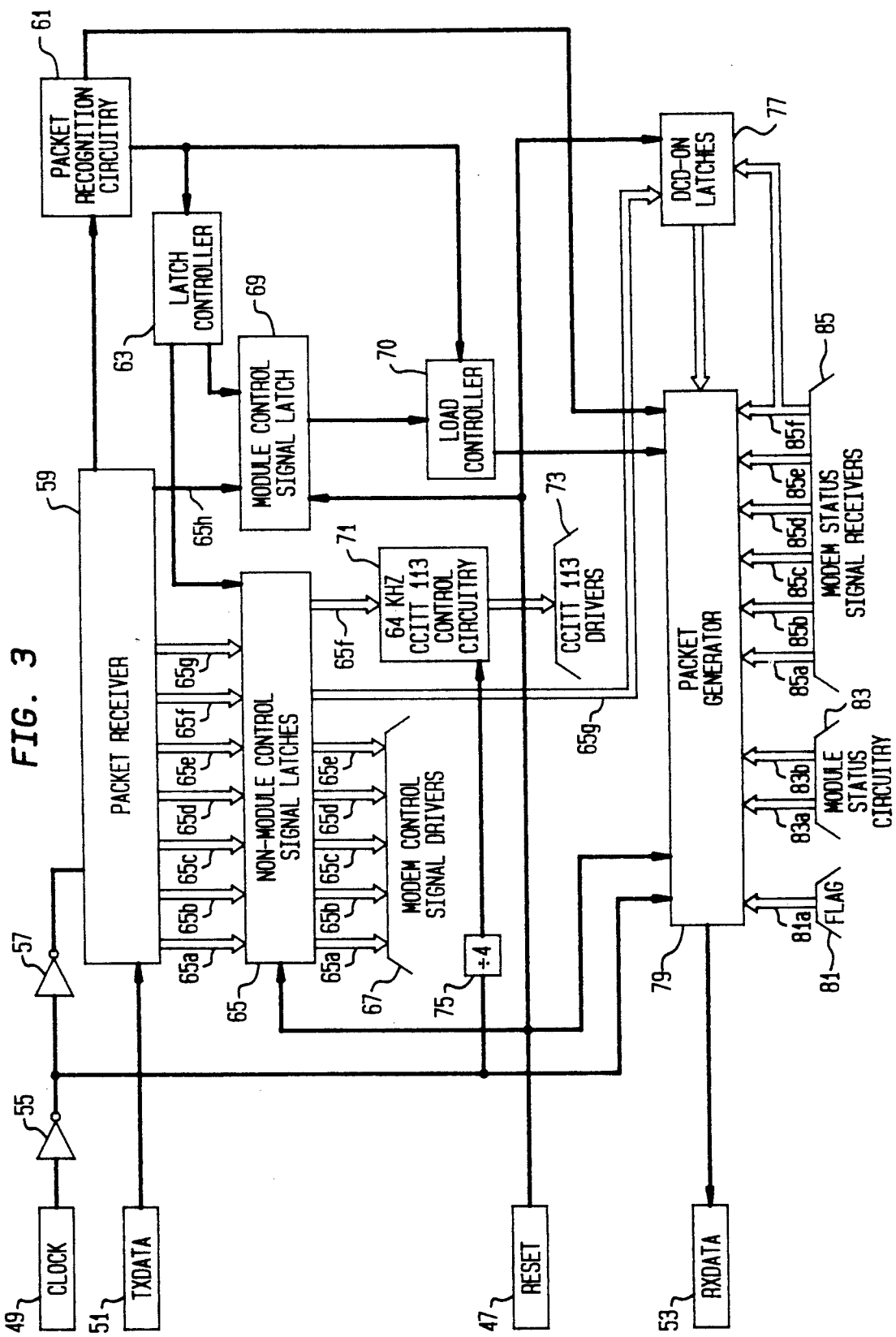
FIG. 3 is a block diagram of receiving and transmitting circuitry of the remote distribution panel illustrated in FIG. 2.

Referring to FIG. 3, the receiving and transmitting circuitry of the remote distribution panel 3 is shown. The signal clock 49 (see FIG. 2) is coupled through two inverters 55 and 57 to a packet receiver 59. The TDM transmit line 51 (see FIG. 2) is also coupled to the packet receiver 59. The packet receiver 59 comprises a series of shift registers which shift in the contents of the serially transmitted control signals from transmit buffers of the line interface card 1. The TDM transmit line 51 transmits modem and module control signals in a TDM format. The entire string of transmit control signals captured by the shift registers is in a packet format in the shift registers. The first eight bits of the packet have a certain bit pattern, which acts as a flag to identify the string as a valid packet. In this embodiment, the bit pattern flag is 01111110. Since the packet receiver 59 comprises shift registers, the first eight bits of a data string are shifted into packet recognition circuitry 61. If the first eight bits match the preselected bit pattern, 01111110, the packet recognition circuitry 61 sends an enabling signal to a latch controller 63 and a load controller 70.

If the packet in the packet receiver 59 is valid, the latch controller 63 will send a latch enable signal to a modem control latch 65. The modem control latch 65 latches the modem control signals 65a–e from the shift registers to the respective modems. These signals are then sent on to the appropriate modem using modem control signal drivers 67. In this embodiment there are five different modem control signals 65a–e for each modem coupled to the remote distribution panel 3: RTS (Request to Send) 65a, DTR (Data Terminal Ready) 65b, DSRS (Data Speed Rate Selector) 65c, RL (Remote Loopback) 65d, and LL (Local Loopback) 65e.

In addition to modem control signals 65a–e, the transmit control string also includes three different module control signals 65f–h. Clock_113_On 65f is an enabling signal for a 64khz clock which is coupled to a CCITT 113 pin external serial interface connector. There is one Clock_113_On signal 65f for each modem. DCD_CLR 65g is used to reset a DCD ON detection circuit, as described above. There is one DCD_CLR signal 65g for each modem. Remote Internal Loopback (RIL) 65h places the receiving/transmitting circuitry of FIG. 3 into an internal loopback mode. This allows the connectivity between the line interface card i and the distribution panel 3 to be analyzed.

The packet receiver 59 is coupled to a module control signal latch 69 which latches the aforementioned RIL signal 65h. The module control signal latch 69 also receives packet recognition information from the latch controller 63. Upon receipt of a valid RIL signal 65h at the module control signal latch 69, an inhibit signal is sent to the latch controller 63, thus inhibiting the latching of data in the packet receiver 59.

Clock_113 On 65f and DCD_CRL 65g are latched in the modem control latch 65. The Clock_113_On signals 65f are sent to CCITT 113 control circuitry 71 which, in turn is coupled to CCITT 113 drivers 73. The clock signal 75 is coupled to a divider circuit 75 which converts this clock signal into a 64khz clock for the CCITT 113 drivers 73. The DCD_CLR signals 65g are sent to the DCD-ON latches 77. Each channel has an individual circuit which sets a flag whenever DCD changes from OFF to ON. This flag remains set until the DCD_CLR signal 65g is received for that particular channel.

The packet generator 79 is coupled to the inverted clock signal 49. It is also coupled to the packet recognition circuitry 61 in order to loopback transmit data during a RIL test. Flag circuitry 81 transmits a flag byte 81a to the packet generator 79 in order to preset the first eight bits of the TDM Receive Data 53 to the packet flag, 01111110. Module status circuitry 83 is coupled to the packet generator to provide two types of module status. Module Identification (MID) 83a is a three bit value indicating the electrical interface standard currently being supported (e.g., V.28, V.11, V.35). Module Revision Number (MRN) 83b is also a three bit value indicating the hardware revision number of the distribution panel.

Modem status signal receivers 85 are also coupled to the packet generator 79. The receivers 85 provide six different modem status signals 85a-f received from each modem. These signals are as follows: CTS (Clear to Send) 85a, DSR (Data Set Ready) 85b, DCD (Data Carrier Detect) 85c, SMI (Speed Mode Indicate) 85d, RI (Ring Indicate) 85e, and TI (Test Indicate). The modem status signal receivers 85 also provide a Data Carrier Detect On (DCD ON) signal to the DCD-ON latches 77. The purpose of the DCD ON signals is to insure detection of a change of state in the DCD signal (from off to on). When handling minimum size packets in a half duplex mode of operation, a window exists in which a legitimate packet may have been received and rejected because the assertion of the DCD signal was missed. This signal is set when DCD changes from the OFF to the ON state only. It remains set until the reset signal is given.

The reset signal 47 is coupled directly to the module control signal latch 69 and the DCD-ON latches 77. Also, the module control signal latch 69 can send a load inhibit signal to the load controller 70 thus disabling the packet generator 79 in the case of a RIL signal. In that situation, the packet generator 79 merely sends back the transmit data from the packet recognition circuitry 61.

Figure 4A:
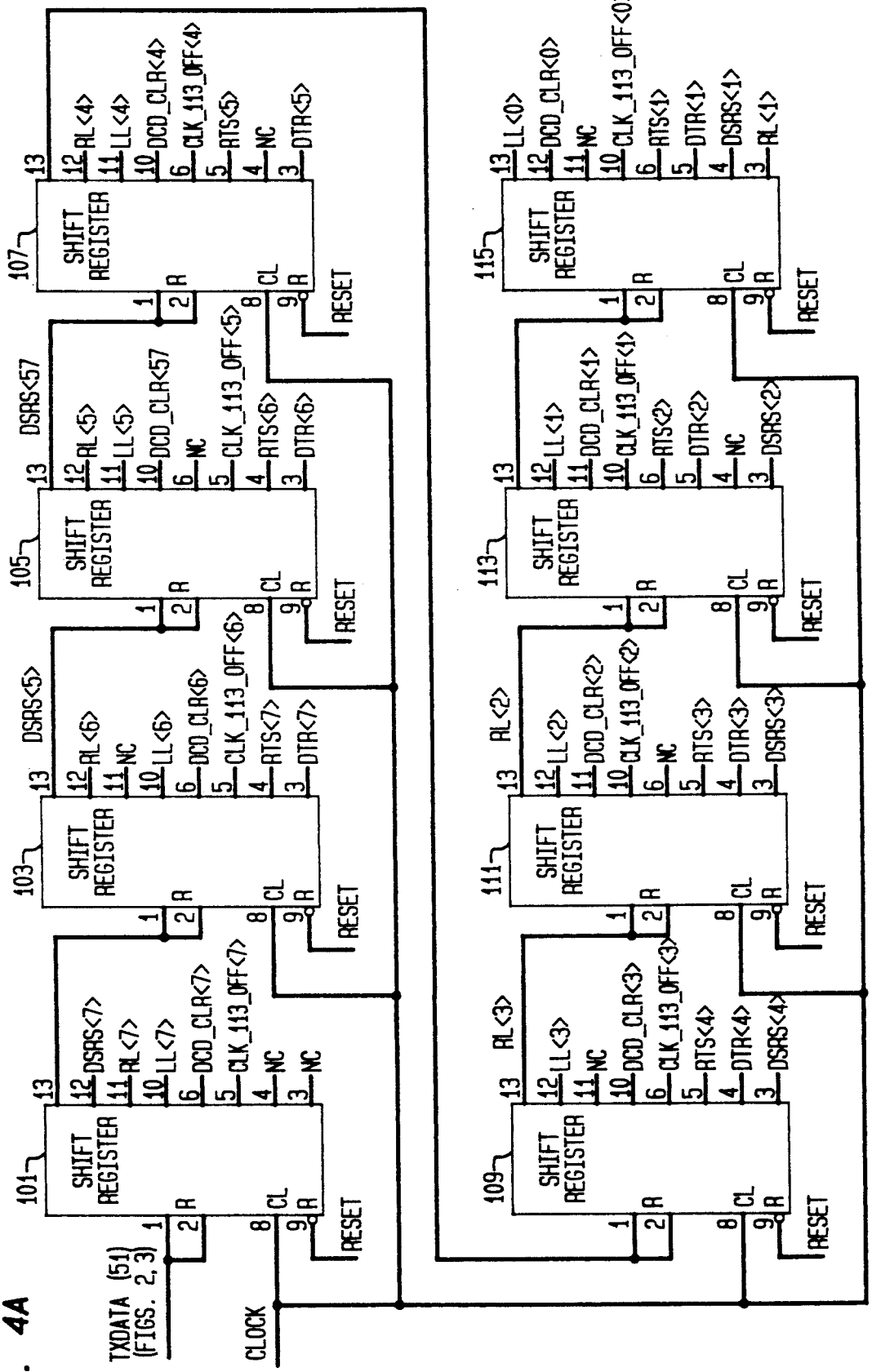
FIGS. 4A & 4B together provide a circuit diagram of the packet receiver of the circuitry illustrated in FIG. 3.
Figure 4B:
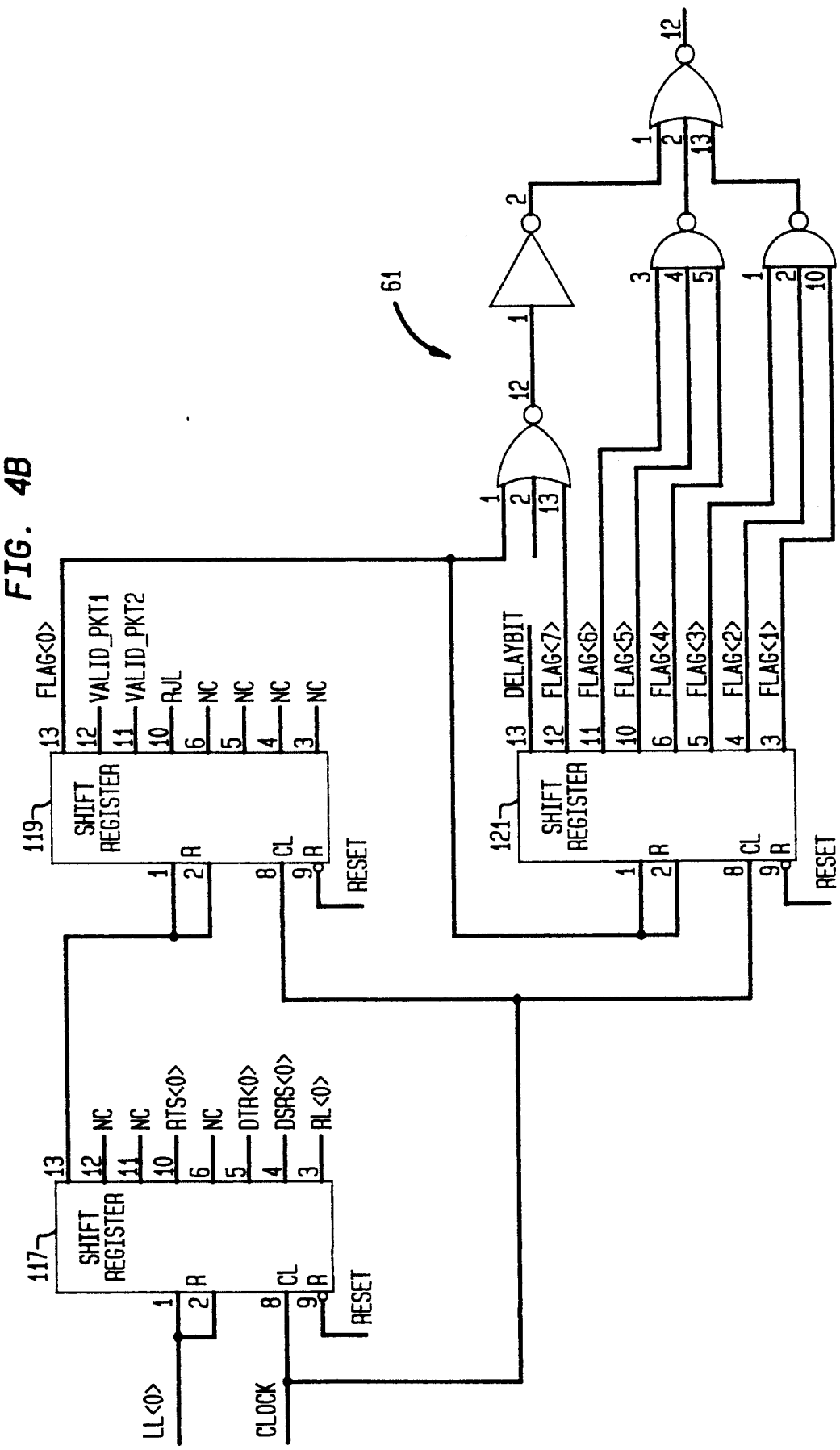
Figure 5B:
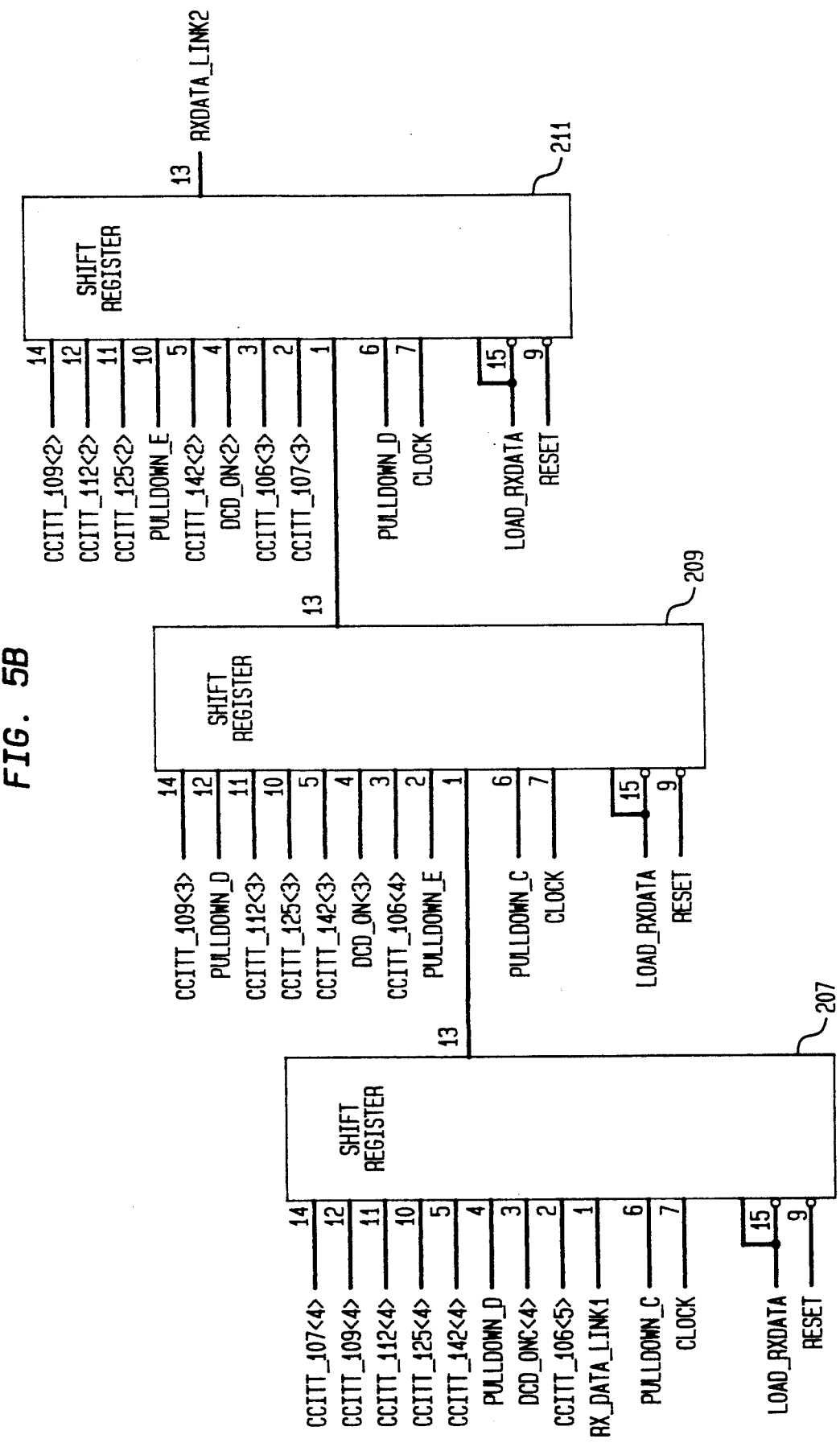
Figure 5C:
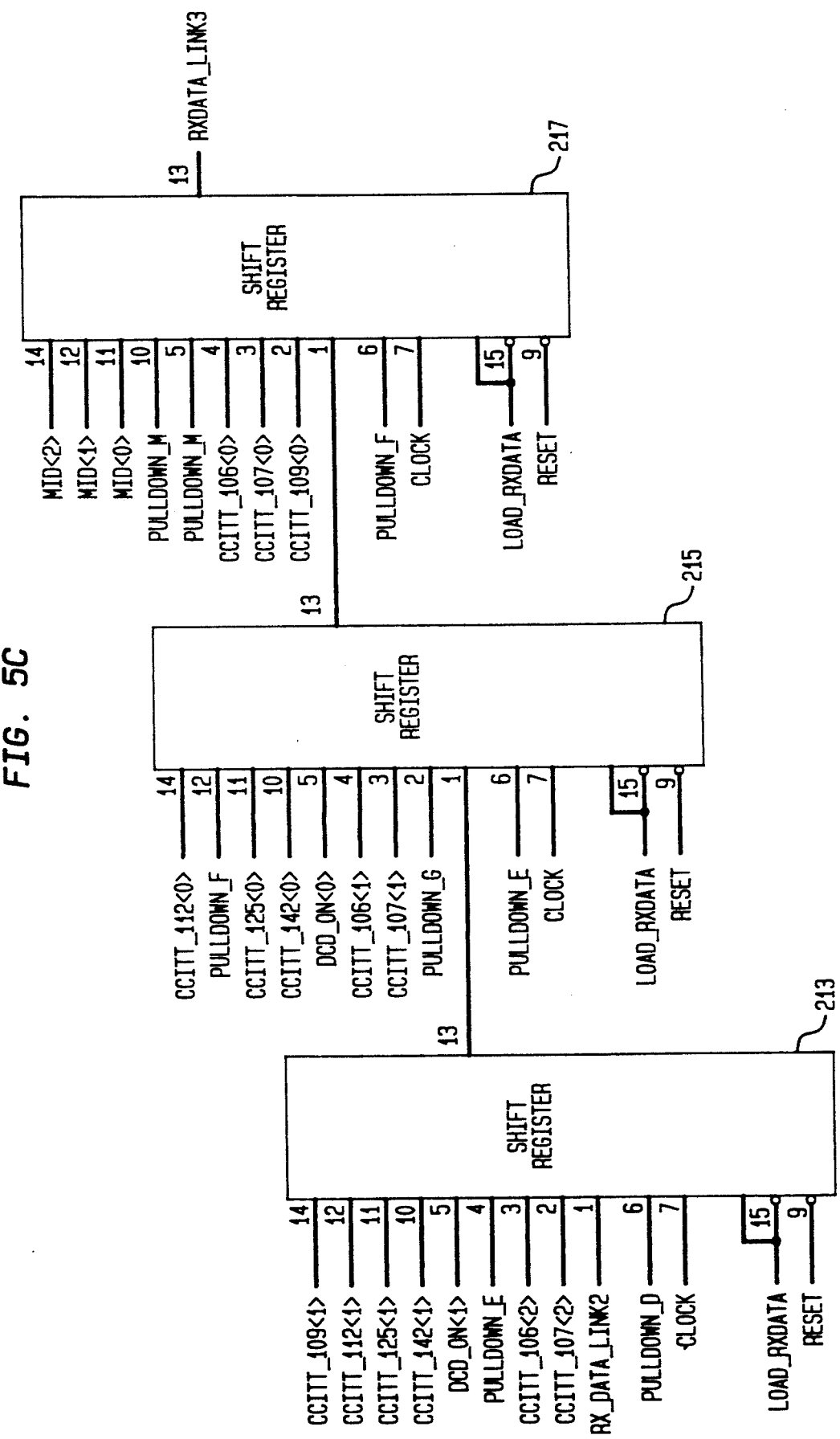

Referring to FIGS. 4A and 4B, a circuit diagram of the packet receiver 59 is shown. The packet receiver 59 comprises a plurality of shift registers 101-119. Each shift register can be, but is not limited to, a 74LS164 chip manufactured by National Semiconductor Corp. The clock 49 is coupled to each of the shift registers 101-119. The transmit data line 51 is coupled to the first input of the first shift register 101.

Data serially received from the transmit line is continuously shifted through the shift registers 101-119 and into the packet recognition circuitry 61. Once the appropriate 01111110 bit pattern flag has been shifted into the shift register 121 of the packet recognition circuitry, the values in the previous shift registers 101-119 are assumed valid and are latched into the signal latches 65 and 69 (see FIG. 4B). As an option, the reset signal line 47 can be coupled to all shift registers 101-121 to insure no erroneous data gets to the modems. It is important to note that no more than five control signals can be bit-serially adjacent to one another. This insures that the packet recognition circuitry 61 will not mistake control data as a packet flag (which comprises six consecutive "1" bits in this embodiment).

Referring to FIGS. 5A-5D, a circuit diagram of the packet generator 79 is shown. The packet generator 79 also comprises a series of shift registers 201-221 which can be, but are not limited to, 74LS166 chips manufactured by National Semiconductor. Flag and status data are constantly updated by the modems at the respective inputs to the shift registers 201-221, as illustrated in FIGS. 5A-5D. To insure that data is received and transmitted at different times in the remote distribution panel 3, the inverse of the clock 49 is coupled to each of the shift registers 201-221. Also, as an option, the reset signal line 47 can be coupled to each of the shift registers 201-221.

The high order bit on the last shift register is directly coupled to the TDM receive data line 53. The load controller 70 (see FIG. 4B) is directly coupled to each of the shift registers 201-221. An enabling signal from the load controller 70 causes the shift registers 201-221 to load the flag, status and control signals coupled to the respective individual registers of the shift registers 201-221 via the modem status signal receiver 85, the flag circuitry 81 and the module status circuitry 83 (see FIG. 3). The data loaded into the shift registers is then shifted out serially to the receive data line 53. It should be readily apparent that the MC68302 processor should be appropriately programmed so that the correct status and control signals are read from and written to the proper buffers.

What is claimed is:

1. An apparatus for coupling a plurality of modems with corresponding line interface units of a line card, comprising:
   a remote distribution panel coupled to each of said line interface units via a multiple wire cable, said remote distribution panel comprising:
   a plurality of serial ports, each adapted for coupling to a modem, such that each of said line interface units selectively communicates with one of said plurality of serial ports via said multiple wire cable; and
   a packet receiver coupled directly to said line card via a first preselected wire of said multiple wire cable, so that said packet receiver receives a first time-division-multiplexed bit stream, wherein said bit stream comprises control information for all of said ports, and wherein said packet receiver demultiplexes said first time-division-multiplexed bit stream and transmits the control information to corresponding ones of the serial ports.

2. The apparatus of claim 1 wherein each of said line interface units comprises a serial communication controller and wherein said line card includes a multiplexing serial communication controller coupled between said multiple wire cable and each of said serial communication controllers.

3. The apparatus of claim 2 wherein said packet receiver comprises a shift register device including an input coupled to the first preselected wire of the multiple wire cable for input of the first time-division-multiplexed bit stream, and a plurality of individual registers coupled to the input for shifting bits of the input first time-division-multiplexed bit stream until each bit of the time-division-multiplexed bit stream is stored in a corresponding one of the individual registers.

4. The apparatus of claim 2, wherein said multiplexing serial communication controller receives control and status information from each of said serial communication controllers for transmission to the corresponding ones of the serial ports.

5. The apparatus of claim 4, wherein said multiplexing serial communication controller converts the control information received from said serial communication controllers into said first time-division-multiplexed bit stream and wherein said multiplexing serial communication controller transmits the first time-division-multiplexed bit stream to said remote distribution panel via said first preselected wire of said multiple wire cable.

6. The apparatus of claim 5 wherein said packet receiver comprises a shift register device including an input coupled to the first preselected wire of the multiple wire cable for input of the first time-division-multiplexed bit stream, and a plurality of individual registers coupled to the input for shifting bits of the input first time-division-multiplexed bit stream until each bit of the time-division-multiplexed bit stream is stored in a corresponding one of the individual registers.

7. The apparatus of claim 6, wherein each of the individual registers is coupled to a corresponding one of the serial ports.

8. The apparatus of claim 7 further comprising a packet receiver control device coupled to said shift register device for controllably latching bits stored in the individual registers to the corresponding serial ports.

9. The apparatus of claim 8, wherein said multiplexing serial controller generates a preselected set of packet recognition bits and transmits the packet recognition bits in the first time-division-multiplexed bit stream.

10. The apparatus of claim 9, wherein said remote distribution panel includes a packet recognition device coupled to the individual registers storing the packet recognition bits and operating to control the packet receiver control device to latch the bits of the first time-division-multiplexed bit stream to the serial ports when the preselected set of packet recognition bits is stored in the corresponding individual registers.

11. The apparatus of claim 3, wherein said remote distribution panel further comprises a packet generator, said packet generator being coupled to said serial ports to receive status information from said serial ports and wherein said packet generator converts the status information received from said serial ports into a second time-division-multiplexed bit stream and transmits the second time-division-multiplexed bit stream to said multiplexing serial communication controller via a second preselected wire of said multiple wire cable.

12. The apparatus of claim 11 wherein said packet generator comprises a second shift register device including individual registers, each coupled to a corresponding one of the serial ports to receive status information and including an output coupled to the individual registers and to the second preselected wire for shifting the contents of the individual registers as the second time-division-multiplexed bit stream onto the second preselected wire.

13. The apparatus of claim 12, wherein said multiplexing serial communication receives and demultiplexes said second time-division-multiplexed bit stream and transmits the corresponding status information to corresponding ones of the serial communication controllers.

14. A method for transmitting control and status signals between a line interface card and a remote distribution panel, the line interface card comprising a plurality of line interface units, the remote distribution panel including a plurality of serial ports, each of the serial ports adapted for coupling to a modem such that each of the line interface units selectively communicates with one of the plurality of serial ports, the signals being transmitted over a multiple wire cable, the method comprising:
generating a first time-division-multiplexed bit stream in the line interface card, the first bit stream comprising control information from the line interface units for corresponding ones of the serial ports;
communicating the first bit stream over a first preselected wire of the multiple wire cable;
receiving the first bit stream in the remote distribution panel;
demultiplexing the first bit stream in the remote distribution panel; and
transmitting the control information of the first bit stream to corresponding ones of the serial ports.

15. The method of claim 14, wherein the remote distribution panel includes a shift register device including an input coupled to the first preselected wire of the multiple wire cable for input of the first time-division-multiplexed bit stream, and a plurality of individual registers coupled to the input, and wherein the receiving step comprises:
shifting bits of the input first time-division-multiplexed bit stream until each bit of the first time-division-multiplexed bit stream is stored in a corresponding on of the individual registers.

16. The method of claim 14, wherein the line interface card includes a multiplexing serial communication controller coupled to each of the plurality of line interface units, and wherein the step of generating the first time-division-multiplexed bit stream is carried out by operating the multiplexing serial communication controller to generate the first time-division-multiplexed bit stream, the method comprising the further step:
receiving in the multiplexing serial communication controller the control information from the plurality of line interface units.

17. The method of claim 15, comprising the further step of:
latching bits stored in the individual registers to the corresponding serial ports.

18. The method of claim 17, wherein the step of generating a first time-division-multiplexed bit stream includes generating a packet recognition flag as preselected bits of the first bit stream, the method comprising the further step:
comparing the packet recognition flag to a preselected bit pattern, such that bits stored in the individual registers for the corresponding serial ports are only latched when the packet recognition flag matches the preselected bit pattern.

19. The method of claim 16, comprising the further steps of:
receiving in said remote distribution panel control and status information from the serial ports;
converting the status information from the serial ports into a second time-division-multiplexed bit stream;
transmitting the bit stream to the multiplexing serial communication controller via a second preselected wire of the multiple wire cable;
receiving the second bit stream in the multiplexing serial communication controller of the line card;
demultiplexing the second bit stream in the multiplexing serial communication controller; and
transmitting the status information of the second bit stream by the multiplexing serial communication controller to corresponding ones of the line interface units.

20. The method of claim 19 wherein the remote distribution panel includes a second shift register device including individual registers, each coupled to a corresponding one of the serial ports to receive status information and including an output coupled to the individual registers and to the second preselected wire, wherein the transmitting step comprises:
shifting the contents of the individual registers as the second time-division-multiplexed bit stream onto the second preselected wire.

* * * * *